United States Patent [19]

Shaw et al.

[11] Patent Number: 4,607,313
[45] Date of Patent: Aug. 19, 1986

[54] STATIC DISCHARGER

[75] Inventors: James R. Shaw; John W. Velsor, both of Wainscott, N.Y.

[73] Assignee: Shaw Aero Devices, Inc., Wainscott, N.Y.

[21] Appl. No.: 514,316

[22] Filed: Jul. 15, 1983

[51] Int. Cl.⁴ .................................................. E05F 3/00
[52] U.S. Cl. .................................. 361/218; 244/1 A; 361/220
[58] Field of Search ............... 361/217, 218, 212, 220; 244/1 A

[56] References Cited

U.S. PATENT DOCUMENTS

| | | | |
|---|---|---|---|
| 1,419,261 | 6/1922 | Howard | 361/218 |
| 2,397,118 | 3/1946 | Bennett | 361/218 |
| 2,466,311 | 4/1949 | Hall. | |
| 2,536,818 | 1/1951 | Lawton. | |
| 2,732,517 | 1/1956 | Alabaster | 361/218 |
| 2,933,732 | 4/1960 | Tanner. | |
| 3,034,020 | 5/1962 | Benkoczy et al.. | |
| 3,106,663 | 10/1963 | Tanner. | |
| 3,480,231 | 11/1969 | Lumn. | |
| 3,482,802 | 12/1969 | Lumn. | |
| 3,498,572 | 3/1970 | Lumn. | |
| 3,755,713 | 8/1973 | Paszkowski. | |
| 3,906,308 | 9/1975 | Amason et al.. | |
| 3,989,984 | 11/1976 | Amason et al.. | |
| 4,352,142 | 9/1982 | Olson | 361/128 |
| 4,398,234 | 8/1983 | Brick et al. | 361/218 |

Primary Examiner—Harry E. Moose, Jr.

[57] ABSTRACT

A static discharger for discharging charge accumulation from the surface of the wing of an aircraft, comprises a generally flat layer of non-conductive material which is dimensioned and configured so that it can be secured to a portion of the wing surface and so as to conform generally to the shape of the wing surface. A generally flat base member is dimensioned and configured so as to be capable of being placed in conforming relationship with at least a portion of the surface of the layer of non-conductive material which insulates the base member from electrically contacting the surface of the aircraft. A plurality of strands formed of a discharging material are embedded in the base member. The plurality of strands are electrically connected to the wing surface of the aircraft so that charge accumulation may pass from the wing surface of the aircraft to the plurality of strands and be discharged at the trailing ends of the strands.

17 Claims, 12 Drawing Figures

STATIC DISCHARGER

TECHNICAL FIELD

This invention relates to charge accumulation discharging devices and more particularly to a static discharger for a surface of an aircraft.

BACKGROUND ART

It is well known to employ static discharge elements in connection with aircraft structures so as to provide for the elimination of static electrical charges accumulated thereon. Such accumulation or build up of electric charges may prove hazardous, e.g., as in the case of the build-up of the static charges in the vicinity of the fuel tanks of the aircraft. In addition, static charge accumulation can also interfere with the radio communication operations or other amplitude modulated equipment. Such communication interference creates a particularly hazardous situation during flight operations which include take-off and landing of the aircraft since it is necessary that the aircraft be in constant communication with ground control and/or other aircraft during flight operations.

Typically, known static discharge elements are constructed of rod-like configurations which extend from a surface portion of an airplane. However, such protrusions increase drag and furthermore are subject to breakage not only as a result of the additional stress to which they are subjected during flight but also by the inadvertent mishandling of the ground personnel during a routine maintenance operation. One such typical static discharge element is shown in U.S. Pat. No. 2,466,311 which describes a static discharger attached to the trailing edge of a wing as shown in FIG. 4 therein. In particular, the '311 patent describes the use of a fibrous surface of a semi-conducting material at static discharge locations on an aircraft. FIGS. 3 and 4 of the '311 patent illustrate a layer of cloth or other fibrous material having separate free fibers cemented about a curved wing edge. The cloth is impregnated with microscopic metallic particles so that the cloth becomes semi-conductive.

U.S. Pat. No. 2,536,818 describes a discharging element wherein the discharging tip consists of a bundle of glass fibers or threads made electrically conductive. U.S. Pat. No. 2,933,732 provides a device such that the discharge allegedly occurs at a null point of the radio field and thus does not appreciably couple to the receiver antenna. In U.S. Pat. No. 3,106,663, the current density field is made perpendicular to the electric field so as to minimize the noise current in an antenna. In both the '732 and the '663 patents, however, the final discharge points are metallic pins or rods. In particular, the '732 patent describes a metal overlay attached to a wing tip or edge but which has a trailing edge of a sufficiently large radius to insure no discharge therefrom except at metal points. In U.S. Pat. No. 3,034,020, the discharger includes a group of fine wires.

U.S. Pat. Nos. 3,480,231; 3,482,802 and 3,498,572 are directed to a combination of an insulating material and conductive coating to provide protection for aircraft and associated components against lightning strikes. The conductive coating is bonded to the skin of the craft and covers the insulating material to permit any charge buildup to run off into a dispersal or charge dissipating area. The insulating material can be either a ceramic or a plastic.

U.S. Pat. No. 3,755,713 describes a typically nonconductive aircraft panel to which a wire mesh material is applied. The wire mesh is electrically connected to the metallic structure of the craft. When struck by lightning the wire mesh fuses and dissipates the energy without damage to the panel.

U.S. Pat. Nos. 3,906,308 and 3,989,984 provide lightning protection by use of dielectric materials in the form of coatings or layers placed over an aircraft surface. However in the '984 patent, the layers of dielectric material are coated by a metallic material which is provided to receive the lightning strike. In the '308 patent the dielectric material is applied to the composite panels or structure of the aircraft and is provided with metal bars or ribs as illustrated in FIGS. 9 and 10 therein for the purpose of attracting the swept-stroke and restrike lightning current.

However, notwithstanding the improvements which the above-identified patents offer, the devices disclosed therein are still subject to the aforementioned limitations of the prior art. In particular none of the above-mentioned patents disclose the use of a static discharge material, constructed preferably in the form of a flat platen, which is electrically insulated from the skin of the aircraft but for a conductive coating or but for a portion thereof contacting the conductive surface of the aircraft which permits charges to flow onto the discharging material to be discharged therefrom. Rather, the '311 patent, for example, describes a layer of cloth which is directly secured to the trailing edge of a wing. Of the next four patents noted above, these relate to conventional static dischargers which employ metallic pins or rods to discharge any static accumulations. Finally, with respect to the remaining six patents described above, the dielectric or insulating material provided is not used for dissipating static charges. Furthermore, in most of these latter six patents, the metallic coatings would prohibit such a direct discharge.

The subject application discloses an inventive static discharger which overcomes the above-noted limitations of the prior art and provides a performance not previously attainable by these known devices.

SUMMARY OF THE INVENTION

The present invention relates to an apparatus for dissipating or discharging static charge accumulation from a moving body, comprising a base member which is dimensioned and configured so as to be capable of being secured to at least a portion of the moving body and so as to conform generally to the shape of the body portion. A plurality of discharging strands are secured to the base member and are positioned so that static charges may flow from the moving body onto the strands and be discharged therefrom.

Preferably, the strands are separately spaced apart and can be twisted a predetermined number of turns so as to selectively control the frequency at which the discharging occurs. If desired, the strands can be twisted a different number of predetermined turns so as to selectively control the various frequencies at which discharging can occur. Moreover, generally flat capacitors can be coupled to the strands so as to form parallel resonant circuits having resonant frequencies in accordance with the respective number of predetermined turns of the strands and the value of the respective capacitors.

Thus, according to the present invention, a static discharger is constructed so as to become generally a part of the surface of an aircraft such as a wing surface. The discharger is constructed in the form of a generally flat platen which is bonded to an insulated portion of the aircraft surface.

The static discharger of the present invention is applicable to fixed-wing aircraft wherein a static discharger would preferably be attached to the trailing edge of the wing. The static discharger is isolated from the metal skin of the wing by coating the skin with a non-conductive coating at the location of the discharger. A conductive coating is provided from the skin, over the non-conductive coating, and to the discharger so as to provide an electrical connection with the skin. In this fashion, static charges are discharged away from the aircraft as the fuselage and wings are forced through the air. The rate of discharge is controlled by the resistance or by the discharger's impedance and the level of the static charge. In a modified embodiment, a plurality of shaped dischargers are positioned and secured at the trailing edge of the wing tips.

The static discharger of the present invention is also applicable to other aircraft surfaces such as helicopter rotor blades.

BRIEF DESCRIPTION OF THE DRAWINGS

The present invention is described in detail hereinbelow with particular reference to the drawings in which.

BEST MODE FOR CARRYING OUT THE INVENTION

In the description which follows, any reference to either orientation or direction is intended primarily for the purpose of illustration and is not intended in any way as a limitation of the scope of the present invention. Also, like elements throughout the drawings are represented by like identifying numerals for ease of reference.

Figure 1:
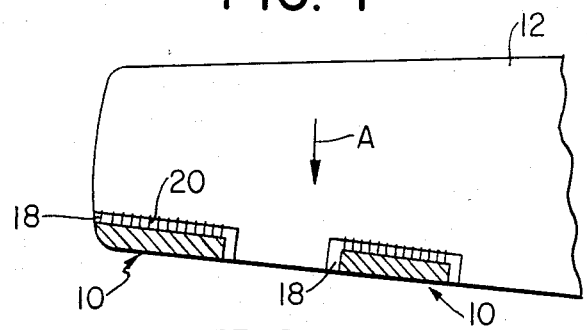
FIG. 1 is a top view of an aircraft airfoil illustrating a static discharger according to the present invention at various positions of a trailing edge portion thereof.

Referring to the drawings, a static discharger 10 is illustrated in FIG. 1 as being positioned at various locations on a trailing edge portion of the left wing 12 of a fixed wing aircraft (direction of airflow indicated by arrow "A"). Preferably, the static discharger 10 will be formed in a generally flat configuration conforming to the shape of the surface of the wing. In this fashion, the drag due to wind resistance is greatly reduced thus offering improved economy and efficiency in operation of the aircraft. In addition breakage by ground personnel which previously has been a well-known problem is avoided.

Figure 2:
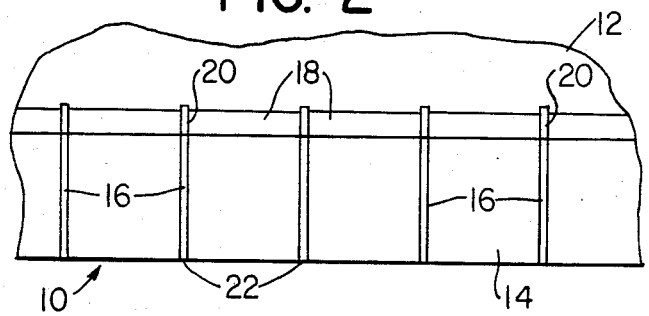
FIG. 2 is a partial enlarged schematic illustration of the static discharger of FIG. 1 illustrating a preferred structural configuration wherein the strands are embedded in a base member in a spaced-apart parallel arrangement.

As shown in FIG. 2, the static discharger 10 is in the shape of a generally flat platen which includes a base member 14 formed of non-conductive matrix such as a resinous material, e.g., epoxy. Embedded in the matrix 14 are strands 16 each formed from a plurality of fibers or filaments which are composed of a material that has a built-in resistance. Although the static discharger 10 is preferably formed of a configuration having a flat-platen shape which can be bonded to any desired portion of the aircraft surface, such as an aircraft wing shown in FIG. 1, the static discharger 10 can have any desired shape and configuration in order to conform to the configuration of the aircraft surface to which it is secured.

In order to isolate the static discharger 10 from the metal skin 12 of the aircraft surface itself, the metal skin is coated with a non-conductive coating 18. The static discharger 10 is then placed within the bounds of the coating 18. However, in order to electrically connect the skin of the aircraft surface to the static discharger 10, a conductive coating such as strips 20 are applied at the leading edge of the static discharger and bridge across the non-conductive coating 18 to make contact with the metal skin of the aircraft surface or wing 12. Thus, in this fashion, corona current will flow into or out of the discharger trailing edge 22 controlled strictly by the polarity of the static charge, the level of voltage, and resistance or impedance of the discharger element.

With respect to the operation of the static discharger 10 shown in FIG. 1, the static charges are forced away from the aircraft by the compression of the air as the fuselage and wings are forced through it. At the wings, elevators, and rudder trailing edges the pressure goes through zero to a vacuum condition. Static dischargers work best in these locations.

Preferably, the fibers are of the type presently employed in known rod-like static dischargers described generally in U.S. Pat. No. 3,767,971. The fibers are formed of a high resistance material employed in known rod-like static dischargers which are available from AVCO Corp. located at 201 Lowell Street, Wilmington, Mass. under the tradename AVRES. Such high resistance material will bleed off any static discharges that tend to build up at the trailing edge of the wing or aircraft surface. Alternatively the high resistance material may be formed of chopped up strands which are broken into small bits and thereafter mixed into a resin base. The high resistance material may also be formed of a powdered composition which can be rolled into a flat sheet which in turn can be laminated.

Figure 3:
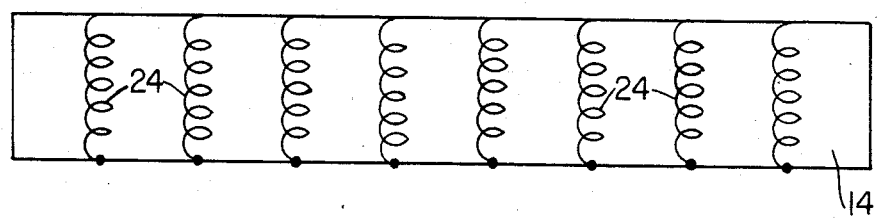
FIG. 3 is an enlarged schematic illustration of the static discharger of FIG. 1 illustrating an alternative structural configuration wherein the strands are twisted and arranged in a spaced-apart parallel relationship.

In a preferred embodiment the strands 24 themselves are twisted as shown in FIG. 3. The twisting of the strands has an advantageous effect on the noise quieting qualities of the static discharger 10. It has been found that the static discharger has an improved noise rejection quality if the strands are twisted, the number of turns depending on the frequency range which is to be protected. In particular, in one preferred embodiment an optimum noise quieting has been found to occur at between 7 and 8 turns of the strands 16.

Figure 4:
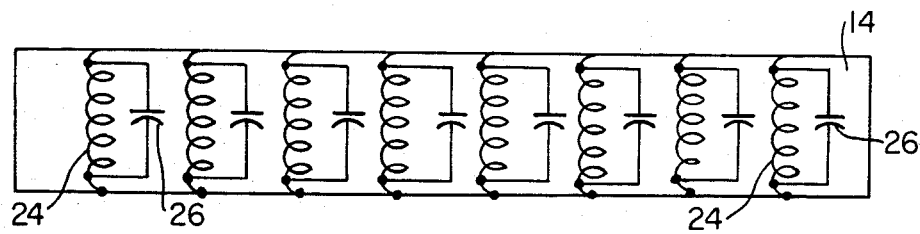
FIG. 4 is an enlarged view of the static discharger of FIG. 1 illustrating an alternative embodiment wherein the twisted strands are coupled to flat molded capacitors.

Furthermore, the use of twisted strands 24 permits the pre-tuning of the static discharger 10 to frequencies covered by on-board amplitude modulated receivers. Since the impedance of a typical parallel-tuned circuit is highest at resonance, the static discharger 10 would therefore pass less corona current at these frequencies and accordingly less noise would be generated. In order to increase the characteristic "Q" of the tuned circuits, flat capacitors 26, as shown in FIG. 4, can be molded as well into the flat static discharger 10. Furthermore, the static discharger 10 can have different twisted strand 24—capacitor 26 combinations (i.e., turns—value, respectively) tuned to different frequencies and thereby cause less noise in the on-board receivers.

Figure 5:
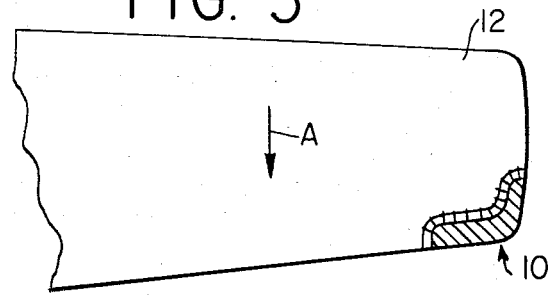
FIG. 5 is a top view of an aircraft airfoil illustrating a static discharger positioned at a tip edge portion thereof.
Figure 6:
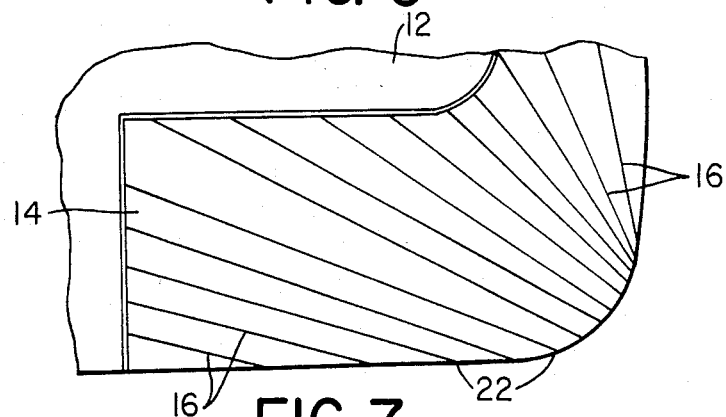
FIG. 6 is an enlarged view of the static discharger of FIG. 5 illustrating the structural configuration of the strands arranged in a generally radially expanding relationship.
Figure 7:
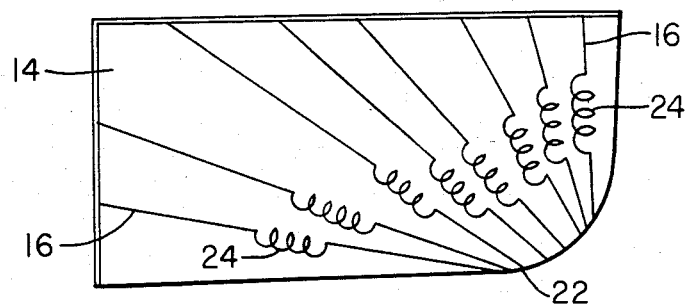
FIG. 7 is a top view of the static discharger of FIG. 5 illustrating the twisting of the strands arranged in a generally radially expanding relationship.

Referring to FIG. 5, the static dishcarger 10 can be positioned at the tip edge of the aircraft wing 12. In this instance, the strands 16 can be radially spaced outwardly from the tip edge as shown more clearly in FIG. 6. As before, the ends 22 of the strands 16 at the trailing edge are exposed while the other ends are bonded to the wing surface, e.g., by strips 20. In addition, as illustrated in FIG. 7, the individual strands 16 can also be twisted a predetermined number of turns for the reasons described above in connection with the structure illustrated in FIG. 3. If desired, further tuning can be obtained, as already described above, by molding flat capacitors coupled to the twisted strands in the fashion described hereinabove with respect to the structure illustrated in FIG. 4. By providing for a different number of turns and different valued capacitors, various pretuned parallel resonant circuits can thus be obtained.

Figure 8:
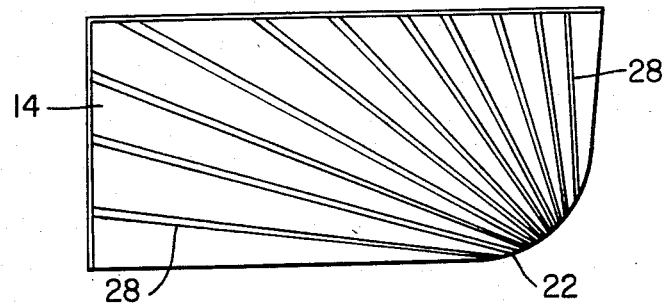
FIG. 8 is an enlarged view of the static discharger of FIG. 5 illustrating an alternative embodiment wherein the strands are formed into spaced apart ribbons, and if desired, of a laminated configuration.

Alternatively, the strands 16 as shown in FIG. 8 can be formed of ribbons 28 positioned in a spaced apart relationship on the base member 14. In a modified embodiment, the ribbons can be formed of a laminated configuration with layers of strands 16 positioned upwardly from the base member 14.

Figure 9:
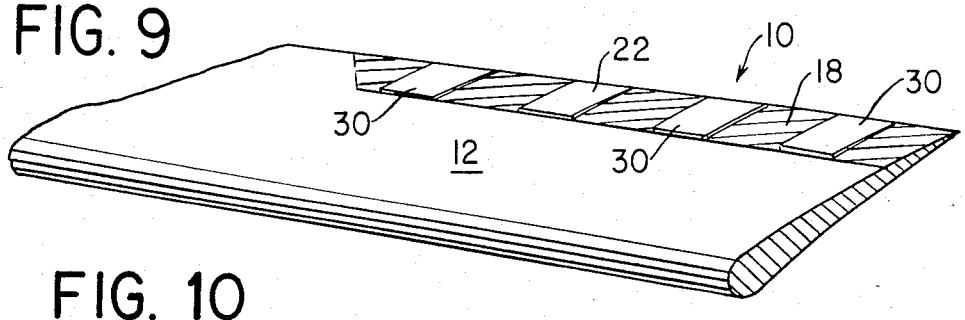
FIG. 9 is a perspective view of a wing of an aircraft illustrating the positioning of a series of the static discharger according to the present invention along the upper surface of the trailing edge of the wing.
Figure 10:
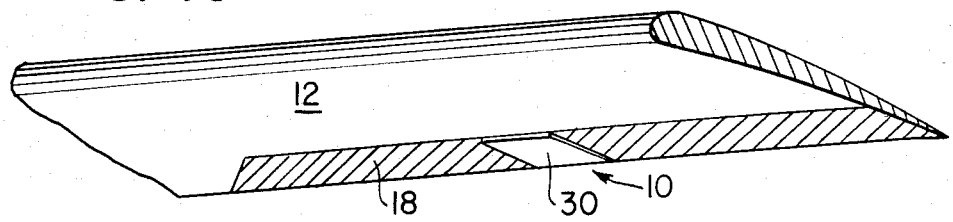
FIG. 10 is a perspective view of the aircraft wing of FIG. 9 illustrating the positioning of a static discharger according to the present invention on the under surface of the trailing edge of the wing.

Although the static discharger 10 has been described hereinabove as being of a generally flat platen configuration, other various configurations may be employed. In this respect, the platen can include any desired curvature to permit securement to a curved portion of the aircraft. The static discharger 10 can also include a plurality of separate units 30 each having its own desired shaped configuration and attached along or on different portions of the aircraft surface as shown in FIG. 9. In particular, they can be positioned along the upper trailing edge surface portions of an aircraft wing 12 over the non-conductive coating 18 as shown in FIG. 9 and electrically connected by connectors 20, as shown in FIG. 2, at their leading edges to the metallic skin or surface of the aircraft. Alternatively, the static discharger units 30 of FIG. 9 can be positioned as shown with their leading edges 30 in contact with the skin of the aircraft wing 12 and the remaining portions thereof overlying the non-conductive coating 18. In addition, the static discharger units may be positioned on the undersurface of the aircraft wing as more clearly shown in FIG. 10.

Figure 11:
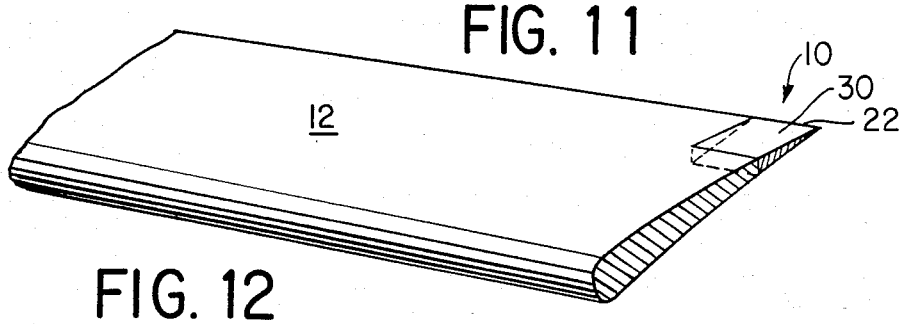
FIG. 11 is a perspective view of the aircraft wing of FIG. 9 illustrating the integration of a static discharger according to the present invention into the trailing tip edge thereof.
Figure 12:
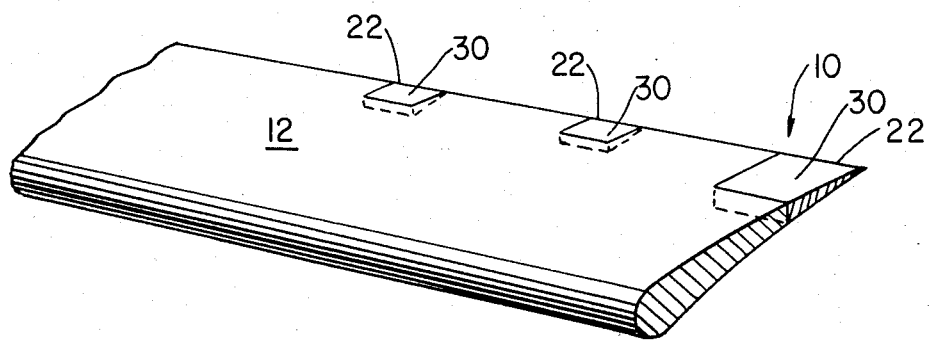
FIG. 12 is a perspective view of the aircraft wing of FIG. 11 illustrating the integration of a series of the static dischargers according to the present invention into the trailing edge of the wing.

If desired the static discharger 10 and separate discharge units 30 can be integrally molded with the surface of the aircraft, e.g., wing 12, as shown in FIGS. 11 and 12.

Thus, as shown in FIG. 2, the static discharger 10 is in the form of a flat platen which can be secured or attached by conventional bonding means and according to methods, e.g., gluing or screwing, known to those skilled in the art, to desired surface portions of the aircraft such as the trailing edge of a fixed wing aircraft or the blade surface of a rotary wing aircraft, e.g., a helicopter. In addition to offering improved discharging of the static charge accumulation with much reduced radio communication interference, the static discharger 10, whether wing-tip or trailing-edge mounted, provides less drag and also minimizes if not eliminates the chance of its being broken off by the personnel attending the aircraft during ground maintenance. The advantage of reduced wind resistance further reduces the erosion and the mechanical load problem of the rotor blade itself.

We claim:

1. An apparatus for discharging static charge accumulation from a moving body, comprising:
    a. base member being dimensioned and configured so as to be capable of being secured to at least a portion of the moving body and so as to conform generally to the shape of the body portion; and
    b. plurality of discharging strands secured to said base member, said strands being positioned in a generally spaced apart arrangement so that static charges may flow from the moving body onto said strands and be discharged therefrom, and said strands being twisted a predetermined number of turns so as to selectively control the frequency at which the discharging occurs.

2. The apparatus according to claim 1 wherein said strands are generally parallel.

3. The apparatus according to claim 1 wherein said strands are positioned in a radially spaced orientation.

4. The apparatus according to claim 1 wherein said strands are twisted a different number of predetermined turns so as to selectively control the frequencies at which the discharging occurs.

5. The apparatus according to any of claims 1 or 4 wherein a predetermined number of strands are each coupled to respective generally flat capacitors so as to form parallel resonant circuits having resonant frequencies in accordance with said predetermined turns and the values of said capacitors.

6. The apparatus according to claim 5 wherein the strands are cast-formed in said base member.

7. The apparatus according to claim 5 wherein said strands are embedded in said base member.

8. The apparatus according to claim 7 wherein said strands are each formed of elongated fibers.

9. The apparatus according to claim 1 wherein said strands are in the form of ribbons positioned in a spaced apart relationship on said base member.

10. The apparatus according to claim 9 wherein said ribbons are formed of a laminated configuration.

11. The apparatus according to claim 10 wherein said base member is of a generally rectangular configuration adapted for being positioned along the trailing edge of an aircraft wing.

12. The apparatus according to claim 11 wherein said base member is integrally formed of the surface portion of the aircraft.

13. The apparatus according to claim 1 wherein said base member is formed of resin.

14. The apparatus according to claim 1 wherein said strands are formed into a powdered configuration which is rolled into a generally flat sheet.

15. The apparatus according to claim 1 wherein said surface is the wing of the aircraft.

16. The apparatus according to claim 1 wherein said surface is a helicopter rotor blade.

17. An apparatus for discharging charge accumulation from a surface of an aircraft, comprising:
   a. generally flat layer of non-conductive material dimensioned and configured so as to be capable of being secured to at least a portion of the surface of the aircraft and so as to conform generally to the shape of said surface portion;
   b. generally flat base member being dimensioned and configured so as to be capable of being placed in conforming relationship on at least a portion of the surface of said layer of non-conductive material which insulates said base member from electrically contacting the surface of the aircraft;
   c. plurality of discharging strands having leading ends and trailing ends, said strands being embedded in said base member and being positioned so that discharging of the charge accumulation can occur from the trailing ends of said strands; and
   d. means for electrically connecting said leading ends of said strands to the surface of the aircraft so that charge accumulation may pass from the surface of the aircraft to said plurality of strands and be discharged therefrom.

* * * * *

UNITED STATES PATENT AND TRADEMARK OFFICE
CERTIFICATE OF CORRECTION

PATENT NO. : 4,607,313

DATED : August 19, 1986

INVENTOR(S) : James R. Shaw, et al

It is certified that error appears in the above-identified patent and that said Letters Patent is hereby corrected as shown below:

On the title page before item [57] please insert the following:

--Attorney, Agent, or Firm -Pennie & Edmonds--.

Signed and Sealed this

Twenty-eighth Day of April, 1992

Attest:

HARRY F. MANBECK, JR.

*Attesting Officer*      *Commissioner of Patents and Trademarks*